US006277521B1

(12) United States Patent
Gao et al.

(10) Patent No.: US 6,277,521 B1
(45) Date of Patent: *Aug. 21, 2001

(54) LITHIUM METAL OXIDE CONTAINING MULTIPLE DOPANTS AND METHOD OF PREPARING SAME

(75) Inventors: Yuan Gao, Ocean, NJ (US); Marina Yakovleva, Gastonia, NC (US)

(73) Assignee: FMC Corporation, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,849

(22) Filed: May 14, 1998

Related U.S. Application Data

(60) Provisional application No. 60/046,571, filed on May 15, 1997, and provisional application No. 60/046,570, filed on May 15, 1997.

(51) Int. Cl.$^7$ ........................................ H01M 4/58
(52) U.S. Cl. ..................... 429/231.1; 429/218.1; 429/223; 429/231.3
(58) Field of Search ................ 429/218.1, 223, 429/231.1, 231.3

(56) References Cited

U.S. PATENT DOCUMENTS

| 4,507,371 | 3/1985 | Thackeray et al. . |
| 4,567,031 | 1/1986 | Riley . |

(List continued on next page.)

FOREIGN PATENT DOCUMENTS

| 0 717 455 A1 | 6/1996 | (EP) . |
| 0 840 386 A1 | 5/1998 | (EP) . |
| 0 840 386 A1 | 6/1998 | (EP) . |
| 0 885 845 A1 | 12/1998 | (EP) . |
| 2 270 195 | 3/1994 | (GB) . |
| 04345759 A2 | 12/1992 | (JP) . |
| 6124707 | 5/1994 | (JP) . |
| 7-192721 | * 7/1995 | (JP) . |
| 07192721 A2 | 7/1995 | (JP) . |
| 8138649 | 5/1996 | (JP) . |
| 8138669 | 5/1996 | (JP) . |

(List continued on next page.)

OTHER PUBLICATIONS

A. De Kock et al., The effect of multivalent cation dopants on lithium manganese spinel catodes, Journal of Power Sources 70 (1998) pp. 247–252, (no month).

Improved Capacity Retention In Rechargeable 4V Lithium/Lithium–Manganese Oxide (Spinel) Cells, R. J. Gummow et al., Solid State Ionics 69 (1994) no month.

The Spinel Phase of $LiMn_2O_4$ As a Cathode in Secondary Lithium Cells, J. M. Tarascon et al., J. Electrochem. Soc. vol. 138, No. 10, Oct. 1991 pp. 2859–2864.

Ambient and High–Pressure Structures of $LiMnVo_4$ and Its $Mn^{3+}/Mn^{2+}$ Redox Energy, A. K. Padhi et al., Journal of Solid State Chemistry 128 (1997), pp. 267–272 no month.

(List continued on next page.)

Primary Examiner—Carol Chaney
(74) Attorney, Agent, or Firm—Alston & Bird LLP

(57) ABSTRACT

The present invention provides a multiple-doped lithium metal oxide and a method of preparing same for use in the positive electrodes of lithium and lithium ion batteries. The intercalation compound of the invention has the formula $LiNi_{1-x}Co_yM_aM'_bO_2$, wherein M is selected from the group consisting of Ti, Zr, and combinations thereof, and M' is selected from the group consisting of Mg, Ca, Sr, Ba, and combinations thereof. The elements in the compounds are present such that $x=y+a+b$, x is from greater than 0 to about 0.5, y is from greater than 0 to about 0.5, a is from greater than 0 to about 0.15, and b is from greater than 0 to about 0.15.

23 Claims, 2 Drawing Sheets

U.S. PATENT DOCUMENTS

| | | |
|---|---|---|
| 4,668,595 | 5/1987 | Yoshino et al. . |
| 4,770,960 | 9/1988 | Nagaura et al. . |
| 5,084,366 | 1/1992 | Toyoguchi . |
| 5,147,738 | 9/1992 | Toyoguchi . |
| 5,168,019 | 12/1992 | Sugeno . |
| 5,169,736 | 12/1992 | Bittihn et al. . |
| 5,180,574 | 1/1993 | Von Sacken . |
| 5,264,201 * | 11/1993 | Dahn et al. ............... 423/594 |
| 5,286,582 | 2/1994 | Tahara . |
| 5,370,949 | 12/1994 | Davidson et al. . |
| 5,425,932 | 6/1995 | Tarascon . |
| 5,429,890 | 7/1995 | Pynenburg et al. . |
| 5,478,671 | 12/1995 | Idota . |
| 5,478,672 | 12/1995 | Mitate . |
| 5,478,673 | 12/1995 | Funatsu . |
| 5,478,674 | 12/1995 | Miyasaka . |
| 5,478,675 | 12/1995 | Nagaura . |
| 5,487,960 | 1/1996 | Tanaka . |
| 5,503,930 | 4/1996 | Maruyama et al. . |
| 5,506,077 | 4/1996 | Koksbang . |
| 5,518,842 | 5/1996 | Fey et al. . |
| 5,591,543 | 1/1997 | Peled et al. . |
| 5,595,842 | 1/1997 | Nakane et al. . |
| 5,609,975 | 3/1997 | Hasegawa et al. . |
| 5,618,640 | 4/1997 | Idota et al. . |
| 5,620,812 | 4/1997 | Tahara et al. . |
| 5,648,057 | 7/1997 | Ueda et al. . |
| 5,672,446 | 9/1997 | Barker et al. . |
| 5,674,645 | 10/1997 | Amatucci et al. . |
| 5,677,087 | 10/1997 | Amine et al. . |
| 5,686,203 | 11/1997 | Idota et al. . |
| 5,700,598 | 12/1997 | Denis et al. . |
| 5,750,288 | 5/1998 | Xie et al. . |
| 5,759,717 | 6/1998 | Amine et al. . |
| 5,780,181 | 7/1998 | Idota et al. . |
| 5,783,332 | 7/1998 | Amine et al. . |
| 5,783,333 * | 7/1998 | Mayer ............... 429/223 |
| 5,900,385 | 5/1999 | Dahn et al. . |
| 5,965,293 | 10/1999 | Idota et al. . |
| 6,017,654 | 1/2000 | Kumta et al. . |
| 6,071,645 | 6/2000 | Biensan et al. . |
| 6,080,510 | 6/2000 | Hemmer et al. . |

FOREIGN PATENT DOCUMENTS

| | | |
|---|---|---|
| 8-250120 * | 9/1996 | (JP) . |
| 8250120 | 9/1996 | (JP) . |
| 8-264179 * | 10/1996 | (JP) . |
| 9-007638 * | 1/1997 | (JP) . |
| 10001316 | 1/1998 | (JP) . |
| 10-001316 * | 1/1998 | (JP) . |
| 10-027611 * | 1/1998 | (JP) . |
| 10214624 | 8/1998 | (JP) . |
| 10-214624 * | 8/1998 | (JP) . |

OTHER PUBLICATIONS

Preparation and Electrochemical Investigation of $LiMn_{1.5}Me_{0.5}O_4$(Me:Ni,Fe) Cathode Materials for Secondary Lithium Batteries, K. Amine et al., pp. 472–473.

D. Gryffroy and R.E. Vandenberghe, Cation distribution, cluster structure and ionic ordering of the spinel series lithium nickel manganese titanium oxide (Linio.5Mn1.5–xTixO4) and lithium nickel magnesium manganese oxide (LiNi0.5–vMgyMn1.5O4): J. Phys. Chem. Solids (1992), 53(6), 777–84 (Abstract only), no month.

D. Gryffroy; R.E. Vandenberghe; and D. Poelman; Optical absorption of nickel ($Ni2+$ (d8)) and manganese ($Mn4+$(d3)) in some spinel oxides; Solid State Commun. (1992), 82(7), 497–500 (Abstract only), no month.

D.G. Wickham and W.J. Croft; Crystallographic and Magnetic Properties of Several Spinels Containing Trivalent JA–1044 Manganese; J. Phys. Chem. Solids; Pergamon Press 1958, vol. 7, pp. 351–360, no month.

Young–II Jang, Biying Huang Yet–Ming Chiang and Donald R. Sadoway; Stabilization of $LiMnO_2$ in the $\alpha$–$NaFeO_2$ Structure Type by $LiAlO_2$ Addition; Electrochemical and Solid–State Letters; 1 (1) 13–16 (1998).

J.N. Reimers, E. Rossen, C.D. Jones and J.R. Dahn: Structure and electrochemistry of $L_ixFe_yNi_{l-y}O_2$; Solid State Ionics 61, pp. 335–344 (1993).

Preparation and Electrochemical Investigation of $LiMn_{2-x}Me_xO_4$ (Me:Ni,Fe, and x=0.5,1) Cathode Materials for Secondary Lithium Batteries, K. Amine et al., Journal of Power Sources 68 (1997) pp. 604–608 (no month).

Doped Li–Mn Spinels: Physical/Chemical Characteristics and Electrochemical Performance in Li Batteries, G. Pistoia et al., Chem. Mater. 9 (1997) , pp. 1443–1450 (no month).

Valence Analysis of Transition Metal Ions in Spinel $LiMnMO_4$(M=Ti, Cr, Mn, Co) By Electron Energy Loss Spectroscopy, S. Suzuki et al., J. Phys. Chem. Solids vol. 57, No. 12, (1996) pp. 1851–1856 (no month).

Thermal Stability of $Li_xCoO_2$, $Li_xNiO_2$ and $\lambda$–$MnO_2$ and Consequences For the Safety of Li–ion Cells, J. R. Dahn et al., Solid State Ionics 69 (1994), pp. 265–270 (no month).

Synthesis and Characterization of $LiAl_{1/4}Ni_{3/4}O_2$ (R3m) for Lithium–Ion (Shuttlecock) Batteries, T. Ohzuku et al., J. Electrochem. Soc., vol. 142, No. 12, Dec. 1995, pp. 4033–4039.

Structure and Electrochemistry of $Li_xMn_yNi_{l-y}O_2$, E. Rossen et al., Solid State Ionics 57, (1992), pp. 311–318 (no month).

Lithium Manganese Cobalt Spinel Cathode for 4V Lithium Batteries, B. Banov et al., 8th International Meeting on Lithium Batteries, Jun., 1996, pp. 452–453.

Chemically Desodiated Thiochromites as Cathode Materials in Secondary Lithium Cells, R. Moshtev et al., Journal of Power Sources, 26 (1989) pp. 285–292 (no month).

* cited by examiner

LITHIUM METAL OXIDE CONTAINING MULTIPLE DOPANTS AND METHOD OF PREPARING SAME

CROSS-REFERENCE TO RELATED APPLICATIONS

This application is related to U.S. patent application Ser. No. 08/954,372, filed Oct. 20, 1997, which is hereby incorporated by reference in its entirety; U.S. Provisional Application No. 60/046,570, filed May 15, 1997; and U.S. Provisional Application No. 60/046,571, filed May 15, 1997; and claims the benefit of these applications under 35 U.S.C. §119(e).

FIELD OF THE INVENTION

This invention relates to metal oxide compounds and to preparation methods thereof. More specifically, this invention relates to doped metal oxide insertion compounds for use in lithium and lithium-ion batteries.

BACKGROUND OF THE INVENTION

Metal oxides such as lithium metal oxides have found utility in various applications. For example, lithium metal oxides have been used as cathode materials in lithium secondary batteries. Lithium and lithium ion batteries can be used for large power applications such as for electric vehicles. In this specific application, lithium or lithium ion cells are put in series to form a module. In the event that one or more of the cells in the module fails, the rest of the cells become overcharged resulting possibly in explosion of the cells. Therefore, it is important that each cell is individually monitored and protected against overcharging.

The most attractive materials for use as cathode materials for lithium ion secondary batteries have been $LiCoO_2$, $LiNiO_2$, and $LiMn_2O_4$. However, although these cathode materials are attractive for use in lithium ion secondary batteries, there are definite drawbacks associated with these materials. One of the apparent benefits for using $LiNiO_2$ and $LiCoO_2$ as cathode materials is that these lithium metal oxides have a theoretical capacity of 275 mA·hr/g. Nevertheless, the full capacity of these materials cannot be achieved in practice. In fact, for pure $LiNiO_2$ and $LiCoO_2$, only about 140–150 mA·hr/g can be used. The further removal of lithium by further charging (overcharging) the $LiNiO_2$ and $LiCoO_2$ material degrades the cycleability of these materials by moving nickel or cobalt into the lithium layers. Furthermore, the further removal of lithium causes exothermic decomposition of the oxide in contact with the organic electrolyte under heated conditions which poses safety hazards. Therefore, lithium ion cells using $LiCoO_2$ or $LiNiO_2$ are typically overcharge protected.

$LiCoO_2$ and $LiNiO_2$ have additional disadvantages when used in lithium ion batteries. Specifically, $LiNiO_2$ raises safety concerns because it has a sharper exothermic reaction at a lower temperature than $LiCoO_2$. As a result, the charged end product, $NiO_2$, is unstable and can undergo an exothermic decomposition reaction releasing $O_2$. See Dahn et al, Solid State Ionics, Vol. 69, 265 (1994). Accordingly, pure $LiNiO_2$ is generally not selected for use in commercial lithium-ion batteries. Additionally, cobalt is a relatively rare and expensive transition metal, which makes the positive electrode expensive.

Unlike $LiCoO_2$ and $LiNiO_2$, $LiMn_2O_4$ spinel is believed to be overcharge safe and is a desirable cathode material for that reason. Nevertheless, although cycling over the full capacity range for pure $LiMn_2O_4$ can be done safely, the specific capacity of $LiMn_2O_4$ is low. Specifically, the theoretical capacity of $LiMn_2O_4$ is only 148 mA·hr/g and typically no more than about 115–120 mA·hr/g can be obtained with good cycleability. The orthorhombic $LiMnO_2$ and the tetragonally distorted spinel $Li_2Mn_2O_4$ have the potential for larger capacities than is obtained with the $LiMn_2O_4$ spinel. However, cycling over the full capacity range for $LiMnO_2$ and $Li_2Mn_2O_4$ results in a rapid capacity fade.

Various attempts have been made to either improve the specific capacity or safety of the lithium metal oxides used in secondary lithium batteries by doping these lithium metal oxides with other cations. For example, cobalt cations have been used to dope $LiNiO_2$. Nevertheless, although the resulting solid solution $LiNi_{1-x}Co_xO_2$ ($0 \leq X \leq 1$) may have somewhat improved safety characteristics over $LiNiO_2$ and larger useful capacity below 4.3 V versus Li than $LiCoO_2$, this solid solution still has to be overcharge protected just as $LiCoO_2$ and $LiNiO_2$.

One alternative has been to dope $LiNiO_2$ with ions that have no remaining valence electrons thereby forcing the material into an insulator state at a certain point of charge and protecting the material from overcharge. For example, Ohzuku et al. (Journal of Electrochemical Soc., Vol. 142, 4033 (1995)) describe that the use of $Al^{3+}$ as a dopant for lithium nickelates to produce $LiNi_{0.75}Al_{0.25}O_4$ can result in improved overcharge protection and thermal stability in the fully charged state as compared to $LiNiO_2$. However, the cycle life performance of this material is unknown. Alternatively, U.S. Pat. No. 5,595,842 to Nakare et al. demonstrates the use of $Ga^{3+}$ instead of $Al^{3+}$. In another example, U.S. Pat. No. 5,370,949 to Davidson et al. demonstrates that introducing chromium cations into $LiMnO_2$ can produce a tetragonally distorted spinel type of structure which is air stable and has good reversibility on cycling in lithium cells.

Although doping lithium metal oxides with single dopants has been successful in improving these materials, the choice of single dopants which can be used to replace the metal in the lithium metal oxide is limited by many factors. For example, the dopant ion has to have the right electron configuration in addition to having the right valency. For example, $Co^{3+}$, $Al^{3+}$, and $Ga^{3+}$ all have the same valency but $Co^{3+}$ can be oxidized to $Co^{4+}$ while $Al^{3+}$, and $Ga^{3+}$ cannot. Therefore doping $LiNiO_2$ with Al or Ga can produce overcharge protection while doping with cobalt does not have the same effect. The dopant ions also have to reside at the correct sites in the structure. Rossen et al (Solid State Ionics Vol. 57, 311 (1992)) shows that introducing Mn into $LiNiO_2$ promotes cation mixing and therefore has a detrimental effect on performance. Furthermore, one has to consider the ease at which the doping reaction can be carried out, the cost of the dopants, and the toxicity of the dopants. All of these factors further limit the choice of single dopants.

In addition to these factors, it is also desirable that the doped lithium metal oxide has a high usable reversible capacity and good cycleability to maintain this reversible capacity during cycling. As mentioned above, $LiNiO_2$ and $LiCoO_2$ have usable reversible capacities in the range of 140–150 mA·hr/g because of their low thermal stability. Moreover, $LiMn_2O_4$ can generally only be operated at 115–120 mA·hr/g with good cycleability. Therefore, there is a need in the art to produce a doped lithium metal oxide that exhibits an improved reversible capacity and good cycleability while maintaining thermal stability.

SUMMARY OF THE INVENTION

The present invention provides a multiple-doped lithium metal oxide and a method of preparing same wherein the dopants used have been found to produce an improved intercalation compound that is particularly suitable for use in the positive electrodes of lithium and lithium ion batteries. Unlike the doped lithium metal oxide compounds of the prior art, the intercalation compound of the invention has a low irreversible capacity and thus has a high reversible capacity during cycling. Furthermore, the intercalation compound of the invention has excellent cycleability and therefore its high reversible capacity can be maintained for hundreds of cycles. The intercalation compound of the invention can be conditioned at normal operating voltages and thus does not require a series of high voltage conditioning cycles. Moreover, the intercalation compound of the invention has good thermal stability, especially in the charged state, as desired for lithium and lithium ion cell applications.

The intercalation compound of the invention has the formula $LiNi_{1-x}Co_yM_aM'_bO_2$, wherein M is selected from the group consisting of Ti, Zr, and combinations thereof, and M' is selected from the group consisting of Mg, Ca, Sr, Ba, and combinations thereof. Preferably, M is titanium and M' is magnesium. The elements in the compounds are present such that x=y+a+b, x is from greater than 0 to about 0.5, y is from greater than 0 to about 0.5, a is from greater than 0 to about 0.15, and b is from greater than 0 to about 0.15. Preferably, $0<x\leq0.5$, $0.1\leq y\leq0.3$, $0\leq a<0.15$, $0<b\leq0.15$, and a is approximately equal to b. In addition, b is preferably no smaller than a. The present invention also includes a positive electrode for lithium and lithium ion batteries comprising the intercalation compound.

The present invention further includes a method of preparing an intercalation compound of the formula $LiNi_{1-x}Co_yM_aM'_bO_2$. According to the method of the invention, stoichiometric amounts of source compounds containing lithium, nickel, cobalt, M' and M, wherein M is selected from the group consisting of Ti, Zr, and combinations thereof, and M is selected from the group consisting of Mg, Ca, Sr, Ba, and combinations thereof, are mixed together to give the desired molar ratio for the formula $LiNi_{1-x}Co_yM_aM'_bO_2$ described above. The mixture is then fired at a temperature between 500° C. and 1000° C. in the presence of oxygen for sufficient time to produce the intercalation compound in a single phase. Preferably, the mixture is fired at a temperature between 500° C. and 600° C.; and then fired at a temperature between 700° C. and 900° C. The resulting intercalation compound is then cooled in a controlled manner.

In addition to the above features and advantages, other features and advantages of the present invention will become more readily apparent to those skilled in the art upon consideration of the following detailed description and drawings which describe both preferred and alternative embodiments of the present invention.

DETAILED DESCRIPTION OF THE PREFERRED EMBODIMENTS

Figure 1:
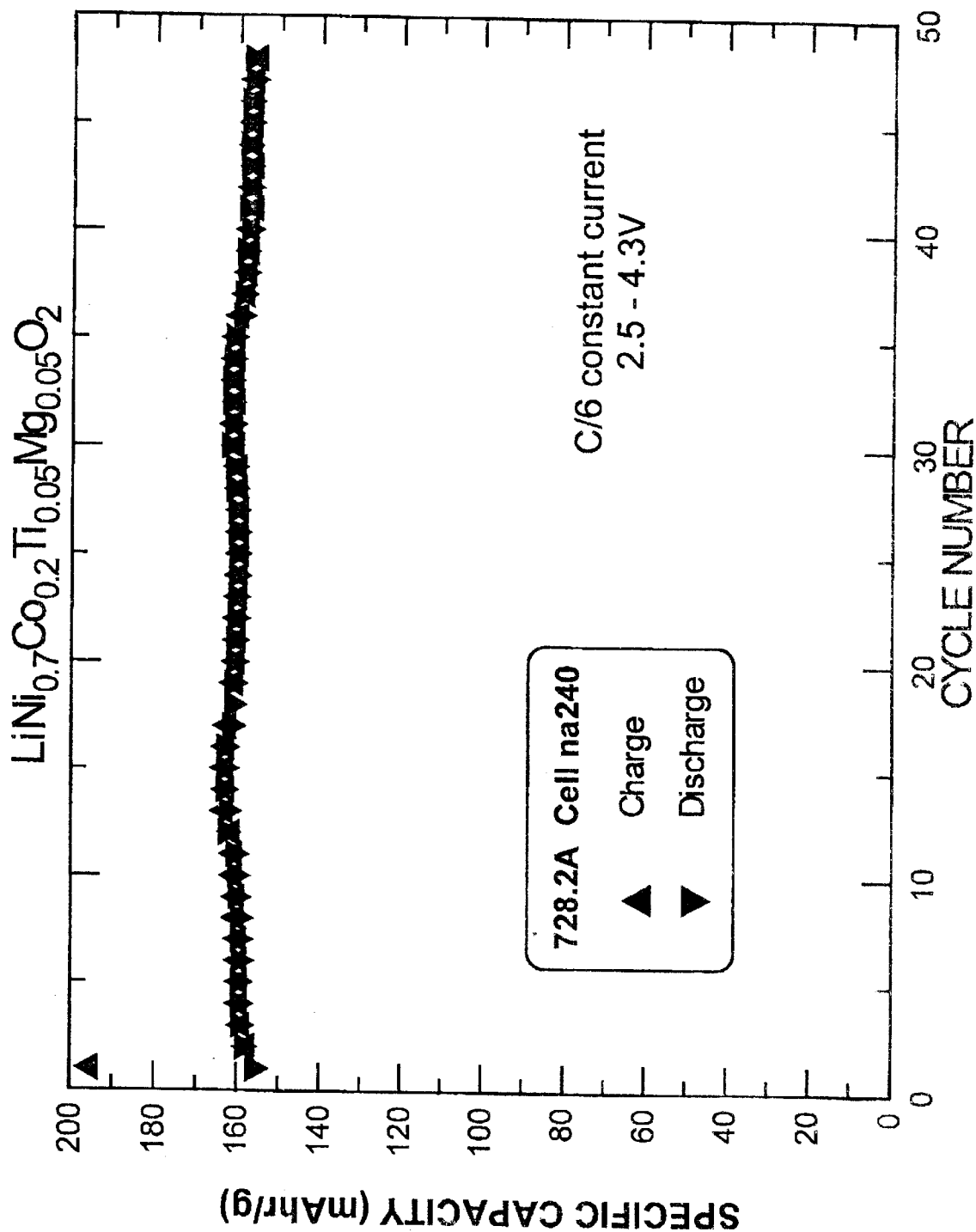
FIG. 1 is a graph of specific capacity versus cycle number for a secondary lithium ion cell including a positive electrode prepared according to the invention.

The present invention will be described more fully hereinafter with reference to preferred embodiments of the invention. This invention can, however, be embodied in many different forms and should not be construed as limited to the embodiments set forth herein; rather, these embodiments are provided so that this disclosure will be thorough and complete, and will fully convey the scope of the invention to those skilled in the art.

The intercalation compounds of the invention have the formula $LiNi_{1-x}Co_yM_aM'_bO_2$, wherein M is selected from the group consisting of Ti, Zr, and combinations thereof, and M' is selected from the group consisting of Mg, Ca, Sr, Ba, and combinations thereof. The elements in the compounds are present such that x=y+a+b, x is from greater than 0 to about 0.5, y is from greater than 0 to about 0.5, a is from greater than 0 to about 0.15, and b is from greater than 0 to about 0.15. Preferably, $0.1\leq y\leq0.3$. In accordance with the invention, these intercalation compounds are typically in a single phase and have a hexagonal layered crystal structure. In addition, as will be understood by those of skilled in the art, Co, M and M' are used as dopants for nickel in $LiNiO_2$ and are not used to take the place of lithium ions in the intercalation compound. Therefore, the reversible capacity is maximized in the intercalation compound of the invention.

As mentioned above, M is selected from the group consisting of Ti, Zr, and combinations thereof, and M' is selected from the group consisting of Mg, Ca, Sr, Ba, and combinations thereof. Preferably, M is Ti and M' is Mg. The use of M and M' at the same time imposes intrinsic overcharge protection on the intercalation compounds and improves the safety of the material while maintaining good cycleability at large capacities. For example, as illustrated using M=Ti and M'=Mg, it is believed that Ti and Mg have the form $Ti^{4+}$ and $Mg^{2+}$ in $LiNi_{1-x}Co_yTi_aMg_bO_2$ because the energies of Mg 2s electrons are higher than Ti 3d electrons which in turn are higher than Ni and Co 3d electrons (Yeh et al, Atomic Data and Nuclear Data Tables Vol. 32, 1–155 (1985)). It can be shown that the oxidation state of nickel and cobalt equals 3 when a=b so that the material can be written as $Li^+Ni_{1-x}^{3+}Co_y^{3+}Ti_a^{4+}Mg_a^{2+}O_2$. Since there are no remaining valence electrons in either $Ti^{4+}$ or $Mg^{2+}$, only (1–2a) Li per formula unit can be removed and therefore overcharge protection is achieved intrinsically. In other words, the charge will stop when all the $Ni^{3+}$ and $Co^{3+}$ is oxidized to $Ni^{4+}$ and $Co^{4+}$ and the fully charged material is $Li_x^+Ni_{1-x}^{4+}Co_y^{4+}Ti_a^{4+}Mg_a^{2+}O_2$. Also, the material is believed to be more stable against decomposition in the fully charged state than $LiNiO_2$ and $LiCoO_2$. This stability improves the safety of the material under overcharge conditions in lithium ion electrochemical cells. Because the average oxidation state of nickel and cobalt is less than 3 in $LiNi_{1-x}Co_yTi_aMg_bO_2$ when b<a, it is preferred that $b\geq a$, especially because $Ni^{2+}$ ions tend to migrate to the lithium layers causing diffusion problems for lithium during electrochemical charge and discharge. Furthermore, it is preferred that b is not much greater than a because the oxidation state of nickel and cobalt will approach 4 which makes it difficult to formulate single phase intercalation compounds. Therefore, the ratio of b:a is preferably between about 1 and about 1/(a+b). In addition, as described above, a and b preferably meet the following relationships: $0<a\leq0.15$, $0<b\leq0.15$, a is approximately equal to b, and b>a.

In a preferred embodiment of the invention, the intercalation compound has the formula $LiNi_{1-x}Co_yTi_aMg_bO_2$, wherein x=y+a+b; $0<x\leq0.5$; $0.1\leq y<0.3$; $0<a<0.15$; $0<b<0.15$; and a is approximately equal to b. Furthermore, preferably b is no smaller than a. Exemplary compounds include $LiNi_{0.7}Co_{0.1}Ti_{0.1}Mg_{0.1}O_2$, $LiNi_{0.75}Co_{0.15}Ti_{0.05}Mg_{0.05}O_2$, and $LiNi_{0.7}Co_{0.2}Ti_{0.05}Mg_{0.05}O_2$.

For the intercalation compounds of the invention, it has been discovered that by combining cations in the ranges described herein, there is significant improvement in the irreversible capacity and cycleability of the intercalation compound. In fact, these improvements have been so significant as to be unexpected for this particular combination of cations. Specifically, these intercalation compounds exhibit a significant decrease in irreversible capacity and significant increase in cycleability. The intercalation compounds prepared according to the preferred embodiment described in the previous paragraph, for example, exhibit an irreversible capacity of about 35 mA·hr/g compared to 80–90 mA·hr/g for compounds that do not include cobalt. This irreversible capacity is much lower than would be expected in the art and allows cells using this material in positive electrodes to operate with a much higher reversible capacity than has been known in the art. Furthermore, these intercalation compounds have excellent cycleability thereby allowing the intercalation compounds to maintain this high reversible capacity. Another unexpected benefit of the intercalation compounds of the invention is that these materials can be conditioned at normal operating voltages (e.g. 4.3 V versus Li) and do not require high voltage conditioning steps.

The present invention also includes a positive electrode (cathode) for lithium and lithium ion batteries comprising the intercalation compound. The intercalation compound of the invention is typically combined with a carbonaceous material and a binder polymer to form a cathode. The negative electrode can be lithium metal or alloys, or any material capable of reversibly lithiating and delithiating at an electrochemical potential relative to lithium metal between about 0.0 V and 0.7 V, and is separated from the positive electrode material in the cell using an electronic insulating separator. Examples of negative electrode materials include carbonaceous materials containing H, B, Si and Sn; tin oxides; tin-silicon oxides; and composite tin alloys. The electrochemical cells further include an electrolyte. The electrolyte can be non-aqueous liquid, gel or solid and preferably comprises a lithium salt, e.g., $LiPF_6$. Electrochemical cells using the intercalation compounds of the invention as positive electrode material can be combined for use in portable electronics such as cellular phones, camcorders, and laptop computers, and in large power applications such as for electric vehicles.

The present invention further includes a method of preparing an intercalation compound of the formula $LiNi_{1-x}Co_yM_aM'_bO_2$. According to the method of the invention, stoichiometric amounts of source compounds containing lithium, nickel, cobalt, M' and M, wherein M is selected from the group consisting of Ti, Zr, and combinations thereof, and M is selected from the group consisting of Mg, Ca, Sr, Ba, and combinations thereof, are mixed together to give the desired molar ratio for the formula $LiNi_{1-x}Co_yM_aM'_bO_2$ described above. As stated above, it is preferred that M is titanium and M' is magnesium. The source compounds (raw materials) can be the pure elements but are typically compounds containing the elements such as oxides or salts thereof. For example, the source compounds are typically hydrated or anhydrous oxides, hydroxides, carbonates, nitrates, sulfates, chlorides or fluorides, but can be any other suitable source compound that will not cause elemental defects in the resulting intercalation compound. The elements for the intercalation compound can each be supplied from separate source compounds or at least two of the elements can be supplied from the same source compounds. For example, mixed source cation compounds such as $TiMgO_3$ and $Ni_{0.75}Ti_{0.25}O$ can be used. In addition, the source compounds can be mixed in any desirable order.

Although the intercalation compounds are preferably prepared by a solid state reactions, it can be advantageous to react the raw materials using wet chemistry such as sol-gel type reactions, alone or in combination with solid state reactions. For example, the source compounds comprising the nickel, cobalt, M and M' can be prepared as a solution in a solvent such as water and the nickel, cobalt, M and M' precipitated out of solution as an intimately mixed compound such as a hydroxide. The mixed compound can then be blended with a lithium source compound. The reaction mixture can also be prepared by suspending source compounds in a solution of other source compounds and spray drying the resulting slurry to obtain an intimate mixture. Typically, the selection of reaction methods will vary depending on the raw materials used and the desired end product.

The mixture once prepared can be reacted to form the lithium metal oxide. Preferably, the mixture is reacted by firing the mixture at a temperature between 500° C. and 1000° C. in the presence of oxygen for sufficient time to produce the intercalation compound in a single phase. Preferably, the mixture is fired in an atmosphere having an oxygen partial pressure of at least about 20 kPa. More preferably, the oxygen partial pressure is about 100 kPa to discourage the material from decomposing into a cubic rock-salt structure. The mixture is generally fired for a total of between about 4 and about 48 hours in one or more firing steps. Preferably, the mixture is first fired at a temperature between 500° C. and 600° C., more preferably about 550° C., for between about 4 and about 24 hours (e.g. 10 hours). The mixture is then fired at a temperature between 700° C. and 900° C., more preferably about 800° C., for between about 4 and about 24 hours (e.g. 10 hours).

The resulting intercalation compound is then cooled in a controlled manner. Preferably, the fired mixture is cooled at a rate of 5° C./min or less. For example, the intercalation compound can be cooled at a rate of 1° C./min until the intercalation compound is at a temperature of about 500° C. The intercalation compound can then be allowed to cool naturally to room temperature.

In the preferred embodiment described above having the formula $LiNi_{1-x}Co_yTi_aMg_bO_2$, a single phase can be obtained by the following steps. First, stoichiometric amounts of a lithium source compound, a nickel source compound, a cobalt source compound, a titanium source compound and a magnesium source compound are mixed in any desired order to give the desired molar ratio according to the formula $LiNi_{1-x}Co_yTi_aMg_bO_2$. As described above, the lithium, nickel, cobalt, titanium and magnesium can be supplied by separate source compounds or two or more of these elements can be supplied by a single source compound. For example, $TiMgO_3$ and $Ni_{0.75}Ti_{0.25}O$ are commercially available compounds which can supply two cations for use in the intercalation compounds of the invention. The mixture is fired at a temperature between 500° C. and 600° C., preferably 550° C., and then fired at a temperature between 700° C. and 900° C., preferably 800° C. The mixture is fired in an atmosphere with a partial pressure of oxygen of at least 20 kPa, preferably about 100 kPa. The fired mixture is then cooled in a controlled manner, preferably at a rate of 5° C./min or less. For example, the fired mixture can be cooled at a rate of 1° C./min to 500° C., and then cooled naturally to room temperature. The firing temperature and the soak times are chosen depending on the amounts of the elements used and the oxygen partial pressure so that the lithium to $Ni_{1-x}Co_yTi_aMg_b$ ratio in the structure preferably approximates 1:1 and no significant cation mixing between lithium and the other metals occurs in the layers.

As mentioned above, in addition to producing the intercalation compounds of the invention by solid state methods, these compounds can also be made by wet chemistry methods. For example, Ni, Co, Ti and Mg can be precipitated simultaneously from a solution containing these elements resulting in an intimately mixed compound. The mixed compound having the desired molar ratio according to the formula $LiNi_{1-x}Co_yTi_aMg_bO_2$ can then be blended with a lithium source compound and fired as described above to produce the intercalation compound of the invention. When the elements are mixed using wet chemistry methods, the mixture can generally be fired for a shorter period of time to produce uniform diffusion of the Ni, Co, Ti and Mg.

The present invention will now be described according to the following non-limiting examples.

EXAMPLE 1

Stoichiometric amounts of LiOH, NiO, $Co_3O_4$, $TiO_2$, and $Mg(OH)_2$ to give $LiNi_{0.7}Co_{0.2}Ti_{0.05}Mg_{0.05}O_2$ are mixed and fired at a temperature of 550° C. for 10 hours and then at 800° C. for 10 hours in an atmosphere with the oxygen partial pressure close to 100 kPa. The cooling was controlled at 1° C./min down to 500° C. followed by natural cooling to room temperature. A powder x-ray diffraction pattern of the intercalation compound shows a single phase material with a hexagonal (or rhombohedral) layered structure similar to that of $\alpha$-$NaFeO_2$. The same single phase material was also produced firing the mixture in an atmosphere with the oxygen partial pressure close to 20 kPa.

EXAMPLE 2

Electrochemical cells with lithium metal as the anode and cathodes with $LiNi_{0.7}Co_{0.2}Ti_{0.05}Mg_{0.05}O_2$ (prepared according to Example 1) as the active material were made and tested. The electrolyte was 1M $LiPF_6$ in a 50/50 volume percent mixture of ethylene carbonate and dimethyl carbonate solvents. Celgard 3501 separators and NRC 2325 coin cell hardware were used. The cathode consisted of 85% active material (by weight), 10% super S™ carbon black and 5% polyvinylidene fluoride (PVDF) as a binder polymer, coated on aluminum foil. The test results of one such cell is shown in FIG. 1. The cell was charged and discharged with a constant current of 0.3 mA between 2.5V and 4.3V. The active mass of cell was 9.9 mg, and therefore the current density per active weight was 30 mA/g.

As demonstrated in FIG. 1, the irreversible capacity for the cell is 35 mA·hr/g and thus the reversible capacity obtained at an upper cut-off voltage of 4.3V is 160 mA·hr/g. Therefore, the reversible capacity is improved prior art compounds. Furthermore, the material has excellent cycle stability (or cycleability). These properties have been demonstrated without having to subject the compound to an initial 5V conditioning charge. Instead, the battery was cycled directly at a 4.3V cut-off voltage.

EXAMPLE 3

Figure 2:
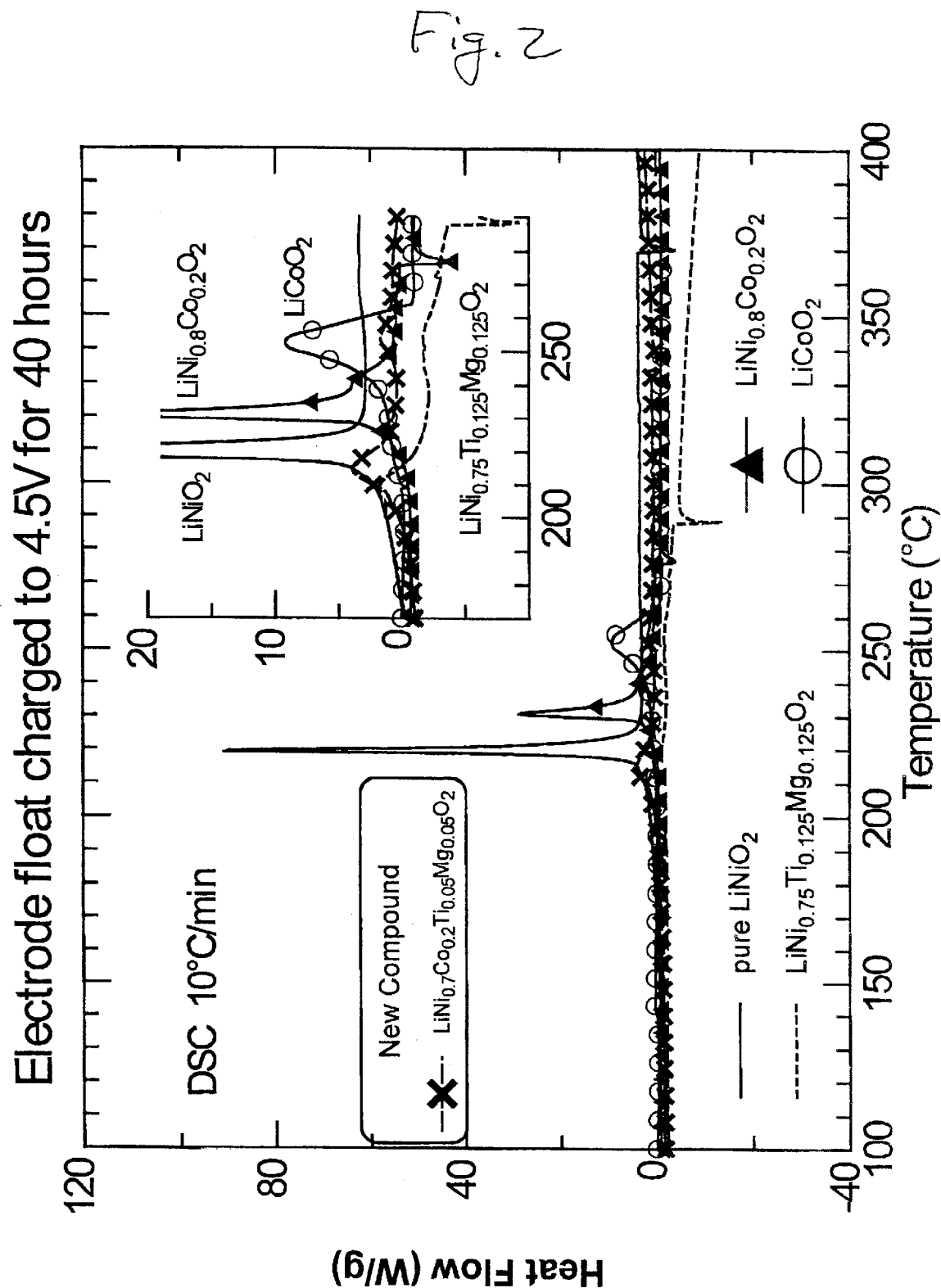
FIG. 2 is a graph of heat flow versus temperature and compares an intercalation compound of the invention to $LiNiO_2$, $LiCoO_2$, $LiNi_{0.8}Co_{0.2}O_2$, and $LiNi_{0.75}Ti_{0.125}Mg_{0.125}O_2$.

$LiNiO_2$, $LiCoO_2$, $LiNi_{0.8}Co_{0.2}O_2$, $LiNi_{0.75}Ti_{0.125}Mg_{0.125}O_2$, and the intercalation compound $LiNi_{0.7}Co_{0.2}Ti_{0.05}Mg_{0.05}O_2$ prepared in Example 1, were each used as the active cathode material for electrochemical cells prepared in the manner described in Example 2 using between 10 mg and 20 mg active material for each cell. The cells were first conditioning charged to 5.0 V and discharged to 3.0 V, and then float charged to 4.5 V with 0.2 mA current for 40 hours to ensure equilibrium conditions. The charged cells were then transferred to a glove box filled with argon and opened. Between 0.1 mg and 1.0 mg of the cathode material from the cells was removed and hermetically sealed into DSC cells. Each of cells contained 10–15% of the electrolyte described in Example 2. FIG. 2 illustrates the DSC results for these compounds with the area of interest magnified in the inset. The positive heat flow in FIG. 2 represent heat flowing out of the sample. As shown in FIG. 2, $LiNi_{0.7}Co_{0.2}Ti_{0.05}Mg_{0.05}O_2$ has a much smaller exotherm than $LiNiO_2$, $LiCoO_2$ and $LiNi_{0.8}Co_{0.2}O_2$ in the delithiated state, and its exotherm is comparable to that of $LiNi_{0.75}Ti_{0.125}Mg_{0.125}O_2$ in the delithiated state. This demonstrates the good thermal stability and safety advantage in the charged state of the material of the invention.

The present invention provides a multiple-doped lithium metal oxide and a method of preparing same wherein the dopants used have been found to produce an improved intercalation compound that is particularly suitable for use in the positive electrodes of lithium and lithium ion batteries. Unlike the doped lithium metal oxide compounds of the prior art, the intercalation compound of the invention has a minimal irreversible capacity loss and thus has a high specific capacity during cycling. Furthermore, the intercalation compound of the invention has excellent cycleability and therefore this high specific capacity can be maintained for hundreds of cycles. The intercalation compound of the invention can be conditioned at normal operating voltages and thus does not require a series of high voltage conditioning cycles. Moreover, the intercalation compound of the invention has good thermal stability, especially in the charged state, as desired for lithium and lithium ion cell applications.

Many modifications and other embodiments of the invention will come to the mind of one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An intercalation compound having the formula $LiNi_{1-x}Co_yM_aM'_bO_2$; wherein M is selected from the group consisting of Ti, Zr, and continations thereof; A' is selected from the group consisting of Mg, Ca, Sr, Ba, and combinations thereof; x=y+a+b; x is from greater than 0 to about 0.5; y is from greater than 0 to about 0.5; a is from greater than 0 to about 0.15; b is from greater than 0 to about 0.15; and a is approximately equal to b.

2. The intercalation compound of claim 1 wherein M is Ti.

3. The intercalation compound of claim 1 wherein M' is Mg.

4. The intercalation compound of claim 1 wherein b is no smaller than a.

5. The intercalation compound of claim 1 wherein $0.1 \leq y \leq 0.3$.

6. An intercalation compound having the formula $LiNi_{1-x}Co_yTi_aMg_bO_2$; wherein x=y+a+b; $0<x\leq 0.5$; $0.1\leq y\leq 0.3$; $0<a\leq b\; 0.15$; $0<b\leq 0.15$; and a is approximately equal to b.

7. A positive electrode for lithium and lithium ion cells comprising an intercalation compound having the formula $LiNi_{1-x}Co_yM_aM'_bO_2$; wherein M is selected from the group consisting of Ti, Zr, and combinations thereof; M' is selected from the group consisting of Mg, Ca, Sr, Ba, and combinations thereof; x=y+a+b; x is from greater than 0 to about 0.5; y is from greater than 0 to about 0.5; a is from greater than 0 to about 0.15; b is from greater than 0 to about 0.15; and a is approximately equal to b.

8. The positive electrode of claim 7 wherein M is Ti.

9. The positive electrode of claim 7 wherein M' is Mg.

10. The positive electrode of claim 7 wherein b is no smaller than a.

11. The positive electrode of claim 7 wherein $0.1 \leq y \leq 0.3$.

12. A method of preparing an intercalculation compound of the formula $LiNi_{1-x}Co_yM_aM'_bO_2$, comprising the steps of:

mixing stoichiometric amounts of source compounds containing lithium, nickel, cobalt, M and M', wherein M is selected from the group consisting of Ti, Zr, and combinations thereof, and M' is selected from the group consisting of Mg, Ca, Sr, Ba, and combinations thereof, to give the desired molar ratio for the formula $LiNi_{1-x}Co_yM_aM'_bO_2$ wherein x=y+a+b, x is from greater than 0 to about 0.5, y is from greater than 0 to about 0.5, a is from greater than 0 to about 0.15, b is from greater than 0 to about 0.15, and a is approximately equal to b;

firing the mixture at a temperature between 500° C. and 1000° C. in the presence of oxygen for sufficient time to produce the intercalation compound in a single phase; and cooling the intercalation compound.

13. The method according to claim 12 wherein the firing step comprises firing the mixture at a temperature between 500° C. and 600° C., and then firing the mixture at a temperature between 700° C. and 900° C.

14. The method according to claim 13 wherein the firing step comprises firing the mixture at about 550° C. and then firing the mixture at about 800° C.

15. The method according to claim 13 wherein said firing step comprises firing the mixture in an atmosphere with an oxygen partial pressure of at least 20 kPa.

16. The method according to claim 13 wherein said firing step comprises firing the mixture in an atmosphere with an oxygen partial pressure of about 100 kPa.

17. The method according to claim 12 wherein said firing step comprises firing the mixture for a time of between about 4 and about 48 hours.

18. The method according to claim 12 wherein said firing step comprises firing the mixture at a temperature between 500° C. and 600° C. for between about 4 and about 24 hours, and then firing the mixture at a temperature between 700° C. and 900° C. for between about 4 and about 24 hours.

19. The method according to claim 12 wherein said cooling step comprises cooling the intercalation compound at a rate of less than 5° C./min.

20. The method according to claim 12 wherein said cooling step comprises cooling the intercalation compound at a rate of 1° C./min until the intercalation compound is at a temperature of about 500° C., and then allowing the intercalation compound to cool to room temperature.

21. The method according to claim 12 wherein said mixing step comprises preparing a solution comprising the nickel, cobalt, M and M' source compounds, precipitating the nickel, cobalt, M and M' out of solution as an intimately mixed compound, and blending the mixed compound with a lithium source compound.

22. The method according to claim 12 wherein at least two of lithium, nickel, cobalt, M and M' are supplied by the same source compound.

23. A method of preparing an intercalation compound of the formula $LiNi_{1-x}Co_yTi_aMg_bO_2$, comprising the steps of:

mixing stoichiometric amounts of source compounds containing lithium, nickel, cobalt, titanium, and magnesium to give the desired molar ratio for the formula $LiNi_{1-x}Co_yTi_aMg_bO_2$ wherein x=y+a+b, x is from greater than 0 to about 0.5, $0.1 \leq y \leq 0.3$, $0 < a \leq 0.15$, $0 \leq b < 0.15$, and a is approximately equal to b;

firing the mixture at a temperature between 500° C. and 600° C. in an atmosphere with an oxygen partial pressure of at least 20 kPa for a period of between about 4 and about 24 hours;

firing the mixture at a temperature between 700° C. and 900° C. in an atmosphere with an oxygen partial pressure of at lease 20 kPa for a period of between about 4 and about 24 hours; and cooling the intercalation compound.

* * * * *

UNITED STATES PATENT AND TRADEMARK OFFICE
CERTIFICATE OF CORRECTION

PATENT NO. : 6,277,521 B1
DATED : August 21, 2001
INVENTOR(S) : Gao et al.

It is certified that error appears in the above-identified patent and that said Letters Patent is hereby corrected as shown below:

<u>Title page,</u>
Item [56], References Cited, U.S. PATENT DOCUMENTS, insert the following:

-- 4,366,215    12/1982    Coetzer et al.
   4,980,251    12/1990    Thackeray et al.
   5,153,081    10/1992    Thackeray et al.
   5,160,712    11/1992    Thackeray et al.
   5,166,012    11/1992    Rossouw et al.
   5,240,794    08/1993    Thackeray et al.
   5,316,877    05/1994    Thackeray et al.
   5,658,693    08/1997    Thackeray et al.
   5,626,635    05/1997    Yamaura et al.
   5,631,105    05/1997    Hasegawa et al.
   5,672,329    09/1997    Okada et al.
   5,866,279    02/1999    Wada et al. --

FOREIGN PATENT DOCUMENTS, insert the following:
-- 98/02928    01/1998    PCT
   11513181    11/1999    JP
   8287914    11/1996    JP
   8078004    03/1996    JP
   6-227820 A    08/1994    JP
   7-114915 A    02/1995    JP
   8-222220 A    08/1996    JP
   9-092285 A    04/1997    JP
   9-306490 A    11/1997    JP --.

OTHER PUBLICATIONS, insert the following:
-- *Structural Aspects of Lithium-Manganese-Oxide Electrodes For Rechargeable Lithium Batteries*; M. H. Rossouw et al., Material Research Bulletin, Vol. 25, No. 2, pp. 173-182, (1990).
  *Spinel Electrodes from the Li-Mn-O System for Rechargeable Lithium Battery Applications*; M. M. Thackeray et al., J. Electrochem. Soc., Vol. 139, No. 2, pp. 363-366, (Feb. 1992). --.

UNITED STATES PATENT AND TRADEMARK OFFICE
CERTIFICATE OF CORRECTION

PATENT NO.   : 6,277,521 B1
DATED        : August 21, 2001
INVENTOR(S)  : Gao et al.

It is certified that error appears in the above-identified patent and that said Letters Patent is hereby corrected as shown below:

Column 8,
Line 50, "continations" should read -- combinations --;
Line 50, "A'" should read -- M' --;
Line 65, cancel "b", first occurrence.

Column 9,
Line 13, "intercalculation" should read -- intercalation --;
Line 22, "$M_u$" should read -- $M_a$ --.

Column 10,
Line 40, "lease" should read -- least --.

Signed and Sealed this

Tenth Day of September, 2002

Attest:

JAMES E. ROGAN
*Attesting Officer*  *Director of the United States Patent and Trademark Office*